United States Patent Office 3,470,212
Patented Sept. 30, 1969

3,470,212
TETRAHYDROFURFURYL ALCOHOL-POLYMERIZED FATTY ACID ESTERS
Robert W. Van Tuyle, Cincinnati, Ohio, assignor to Emery Industries, Inc., Cincinnati, Ohio, a corporation of Ohio
No Drawing. Filed Aug. 20, 1964, Ser. No. 391,039
Int. Cl. C07d 5/20, 5/16
U.S. Cl. 260—347.4                                    7 Claims

ABSTRACT OF THE DISCLOSURE

A diester prepared from tetrahydrofurfuryl alcohol and a polymerized fatty acid useful in the plasticizing of polyvinyl chloride resins.

---

This invention relates to a new composition of matter and in particular it concerns compositions which have been adapted for use in the plasticizing of PVC resins.

Polyvinyl chloride resins are among those plastics which have widest use in the plastics industry. In general, polyvinyl chloride resins are hard, tough, and usually brittle materials which, by themselves, are not particularly useful. However, these characteristics are overcome by compounding the resin with a substantial proportion of a plasticizer which acts to soften the finished product while imparting other favorable physical characteristics thereto such as improved flexibility and elasticity, toughness and strength.

Polyvinyl chloride resins are manufactured by polymerizing vinyl chloride monomer, either alone or in admixture with other monomers, for example, vinyl acetate or vinylidene chloride. For purposes of this invention the term polyvinyl chloride resin is intended to include any of the family of polymers produced by the homopolymerization of vinyl chloride or by the copolymerization thereof with other polymerizable monomers.

Many plasticizers have been used in the past for formulation with polyvinyl chloride resins. The principal plasticizers in use are of two general types.
(1) Monomeric plasticizers, and
(2) Polymeric plasticizers The monomeric plasticizers usually comprise esters of various monohydric alcohols with dicarboxylic acids, such as phthalic, azelaic, adipic and sebacic acids. The polymeric plasticizers consist of polyesters formed by the reaction of a glycol (a dihydric alcohol) with a dibasic acid. A monohydric alcohols or a monobasic acid may be incorporated as a chain stopper to control the molecular weight of the resulting polymeric plasticizer. Polymeric plasticizers in use today vary from approximately 750 to 8000 in molecular weights. The volume of monomeric plasticizers used today constitutes by far the greater proportion of the total quantity consumed in the industry. However, for various reasons none of the monomeric plasticizers available provides the optimum conditions for all the various properties needed in the plastic. Monomeric plasticizers are of low molecular weight, being usually less than 450 in molecular weight, and consequently are generally found to be deficient in those properties referred to in the art as "permanence characteristics." Low volatility, low migration rates from the plastic and resistance to extraction by solvents are directly related to the molecular weight of the plasticizer. Consequently, when plastic vinyl compositions are subjected to severe environmental conditions, a polymeric plasticizer must be employed if the product is to retain its original properties of elasticity, toughness and strength.

The object of this invention is to provide a novel composition of matter useful for plasticizing polyvinyl chloride resin, which is of the monomeric type but has a high molecular weight in the range of the polymeric plasticizers and which possesses the qualities of permanence characteristics of the polymeric esters.

It has been found that high molecular weight monomeric plasticizers can be provided by esterification of a dimerized fatty acid (a polymer of two molecules of fatty acid) with tetra hydrofurfuryl alcohol, to produce the corresponding tetra hydrofurfuryl ester wherein substantially all the carboxylic acid groups have been esterified by the alcohol. Such esters are compatible with polyvinyl chloride resin and can be employed effectively to compound plastic compositions.

The term "dimerized fatty acid" as employed herein is recognized in the chemical art to designate a class of dibasic acids formed by dimerizing fatty acids containing ethylenic linkages and from about 14 to about 22 carbon atoms. Acids which dimerize to form these products include oleic, palmitoleic, linoleic, linolenic, licanic, arachidonic, erucic, clupanodonic, elaeostearic, etc. In commercial practice naturally occurring mixtures of these acids are generally employed for production of dimerized fatty acids. Such acids may be derived from sources such as tall oil and vegetable oils, e.g., soya, linseed, cottonseed and other oils comprised of unsaturated fatty acid glycerides. In general, the dimerization is carried out by heating the monomeric acid at an elevated temperature, with or without a catalyst, while avoiding cracking and decarboxylation. U.S. Patents 2,482,761, 2,664,429, 2,793,219, 2,793,220 and 2,955,121 describe these products and their preparation in further detail. Various types of dimerized fatty acids are available and the commercial products frequently contain trimerized fatty acids, which are tribasic acids formed as a by-product through the polymerization of three molecules of the fatty acids. In addition, the commercial products may contain small percentages of isomerized monobasic acids, or unreacted monomeric monobasic fatty acids which were not removed after the polymerization was carried out. The dimerized fatty acids employed to prepare the novel compositions of this invention preferably comprise a product having not more than about 40% trimer acid, and for plasticizer use preferably not more than about 25%, and not more than about 10% monobasic acids, present either as unreacted fatty acids or as isomerized monobasic acids. Excessive quantities of these by-products interfere with optimum plasticizer characteristics and esters of the monobasic acids can lead to incompatibility.

The dimerized fatty acids as described above consist essentially of dibasic acids ranging from 28 to 44 carbon atoms in molecular size, and the most commonly employed dimerized fatty acids comprise dibasic acids of about 36 carbon atoms. Consequently, when these dimerized fatty acids are esterified with alcohols of the alkanol type such as butyl, iso-octyl, isodecyl, etc., that are commonly employed to make the esters of dibasic acids used for plasticizers, there are produced esters with molecular weights above 750. Although these esters possess many of the properties of polyester plasticizers, they are incompatible with polyvinyl chloride resins and are completely unsatisfactory as vinyl plasticizers. It is a well recognized principle in the art of producing plasticizers for vinyl resins that an ester must contain one ester group for about every 13 carbon atoms or less if the ester is to be compatible with PVC resin, because it is the ester groups that impart the polarity to the molecule which is necessary for compatibility. An ester such as the dioctyl ester of a dimerized fatty acid contains approximately 26 carbon atoms per ester group hence is incompatible with vinyl resins and cannot be used as the plasticizer in a vinyl formulation. Polyesters of similar molecular weight contain a number of repeating ester units hence the ratio of ester groups to carbon atoms is sufficiently high to produce a product compatible with PVC resins.

The novel compositions of this invention consist of dimerized fatty acids as described above, esterified with the equivalent quantity of tetra hydrofurfuryl alcohol to produce esters of the following general formula:

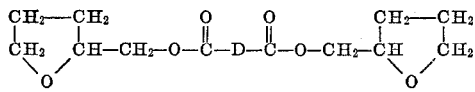

wherein

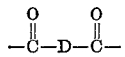

represents the diacyl groups derived from a dimerized fatty acid as described previously.

The tetra hydrofurfuryl structure derived from the alcohol employed to esterify the dimerized fatty acid provides a cyclic ether oxygen which imparts additonal polarity to the molecule and is the approximate equivalent of the carboxyl group of the ester with respect to its ability to make a compound compatible with PVC resin. Consequently, the ditetra hydrofurfuryl ester of a dimerized fatty acid has the equivalent of four ester groups and a ratio of one such ester or cyclic ether group for not more than 13 carbon atoms. As a result, the novel esters of this invention are compatible with polyvinyl chloride resins and are capable of plasticizing the resin. As a specific example of such ester, there may be mentioned the plasticizer resulting from esterification of a dimerized oleic-linoleic acid mixture (obtained from tall fatty acids) with tetra hydrofurfuryl alcohol. This ester has a molecular weight of approximately 750 and is an ester of very low volatility.

The novel plasticizers of this invention, as defined above, can be employed in varying proportions to prepare vinyl formulations with a wide range of properties.

The proportion of plasticizer used may vary from about 5 to about 150 parts by weight per hundred parts of resin (PHR). These plasticizers can be used alone or in mixtures of these plasticizers or they may be formulated together with other suitable plasticizers from the prior art, such as, for example, epoxidized fatty acid esters, phthalate esters, azelaic acid esters, polymeric plasticizers and hydrocarbons.

The polyvinyl chloride composition may also contain stabilizers to protect the resin from degradation and decomposition by light and heat, fillers, pigments, dyes for coloring, mold lubricants and other additives as are well known to those familiar with the art.

In order to point out more fully and to better describe the nature of the novel compositions of the present invention, the following examples are presented which illustrate the invention.

EXAMPLE I

Ten moles (1020 grams) of tetra hydrofurfuryl alcohol and 2 moles (1130 grams) of Empol 1014 Dimer Acid were charged to a three-liter reaction flask. Empol 1014 Dimer Acid is a commercial product containing 95% dimerized fatty acid of approximately 565 molecular weight, 4% trimerized fatty acid of approximately 845 molecular weight and 1% of monobasic $C_{18}$ acids. The reaction flask was fitted with a stirrer thermometer, and a Vigreaux column with a condenser set for distillation. 0.6 gram of dibutyl tin oxide was added as a catalyst. The mixture was heated and water removed by distillation as it formed. When the reaction temperature reached approximately 210° C. additional tetra hydrofurfuryl alcohol was added as needed to control the temperature of the reaction at 210° C. When the acid value reached a value of below approximately 2, after about 6 hours, the excess alcohol was removed by distillation in vacuo. The residual ester was a clear amber colored liquid with a high viscosity, and very low volatility. When blended with PVC resin using 56 parts of ester and 100 parts of resin the mixture fluxed readily on a standard rubber mill at a temperature of 170°. The milled sheet was then molded in a 6" x 6" x 0.075 mold in a heated press at 177° C. A clear pliable sheet was obtained from which the plasticizer did not spew.

EXAMPLE II

Employing the same procedure as described in Example I, the dibutyl ester of Empol 1014 Dimer Acid was prepared. The resulting ester was an amber liquid of high viscosity and very low volatility. When blended with a vinyl resin using 55 parts of plasticizer and 100 parts of resin and placed on a standard 2 roll rubber mill at 170° C. the mixture would not flux but remained on the mill as a furfuraceous solid. It was completely unsatisfactory for a plasticizer.

EXAMPLE III

Employing the method described in Example I, the tetra hydrofurfuryl ester of Empol 1022 Dimer Acid was prepared. Empol 1022 Dimer Acid is a commercial product comprising 75% of dimerized fatty acid of molecular weight of approximately 565, 22% of trimerized fatty acid of molecular weight of approximately 845, and approximately 3% of monobasic acids. The resulting ester was an amber colored liquid of high viscosity and low volatility. When milled with a vinyl resin in accordance with the method of Example I, it fluxed readily to form a plastic sheet. When this sheet was pressed in a mold a smooth pliable sheet was obtained from which the plasticizer did not spew.

What I claim is:
1. A composition of matter comprising the diester formed from a tetrahydrofurfuryl alcohol and a dimerized fatty acid, said fatty acid being unsaturated and containing from 14 to 22 carbon atoms, and the resulting dimerized product containing not more than 40% trimerized unsaturated fatty acid and not more than 10% monomeric acid.
2. A composition of matter comprising the ditetra hydrofurfuryl ester of dimerized oleic acid.
3. A composition of matter comprising the ditetra hydrofurfuryl ester of dimerized linoleic acid.
4. A composition of matter comprising the ditetra hydrofurfuryl ester of the dimerized fatty acids derived from tall oil.
5. A composition of matter comprising the ditetra hydrofurfuryl ester of the dimerized fatty acids derived from linseed oil.
6. A composition of matter comprising the ditetra hydrofurfuryl ester of the dimerized fatty acids from soya oil.
7. A composition of matter comprising the ditetra hydrofurfuryl ester of the dimerized fatty acids from cottonseed oil.

References Cited

UNITED STATES PATENTS

| | | | |
|---|---|---|---|
| 2,341,239 | 2/1944 | Percy et al. | 260—407 |
| 2,365,919 | 12/1944 | Uloth et al. | 260—407 |
| 2,234,615 | 3/1941 | Alexander | 260—347.4 |
| 2,955,121 | 10/1960 | Myers et al. | 260—407 |

ALEX MAZEL, Primary Examiner

B. I. DENTZ, Assistant Examiner

U.S. Cl. X.R.

260—30.4